Oct. 10, 1933.      J. H. JACOBS      1,930,390
WIND DRIVEN UNIT
Filed March 25, 1932      2 Sheets-Sheet 1

Inventor
Joseph H. Jacobs

By Geo. P. Kimmel
Attorney

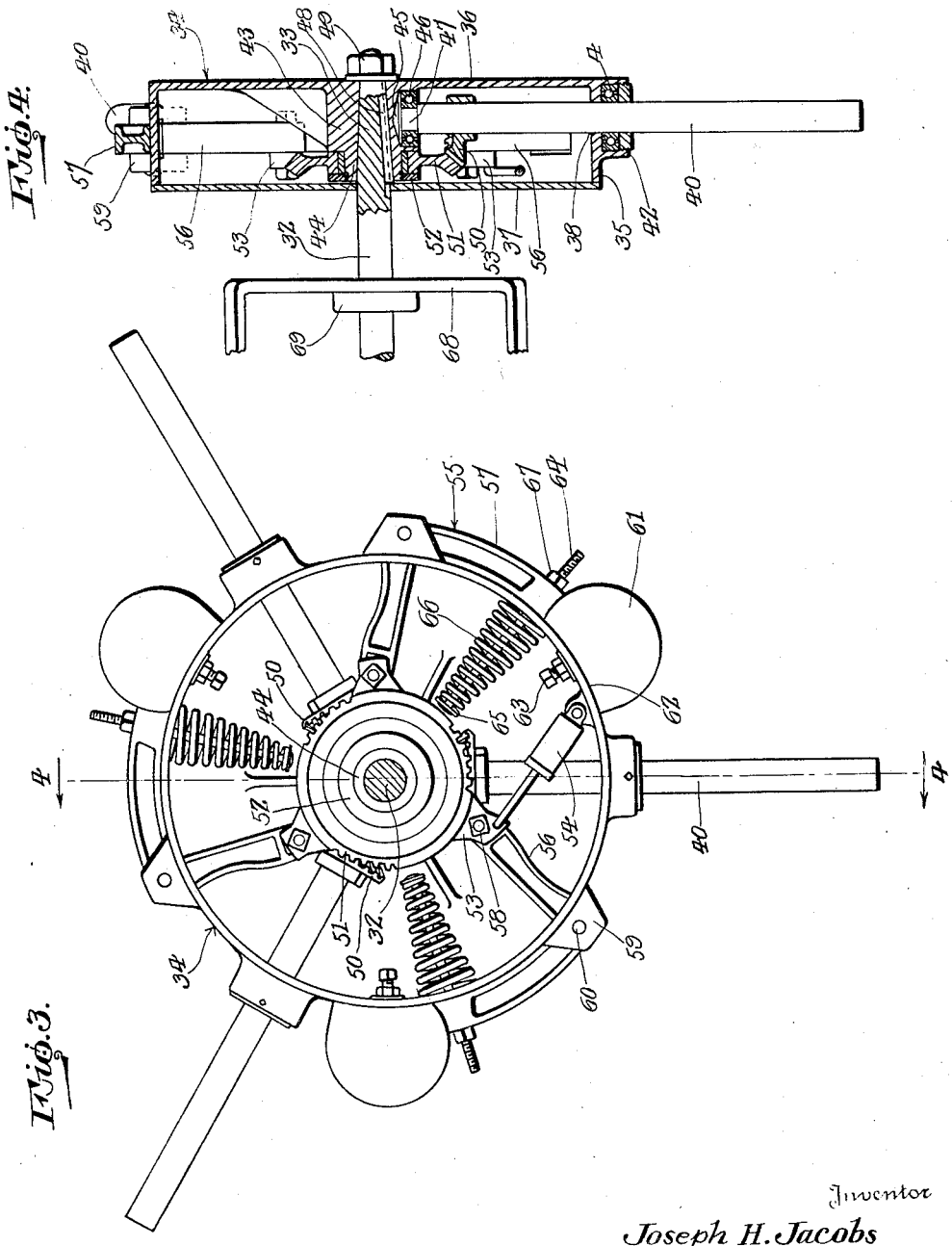

Patented Oct. 10, 1933

1,930,390

UNITED STATES PATENT OFFICE 1,930,390

WIND DRIVEN UNIT

Joseph H. Jacobs, Minneapolis, Minn.

Application March 25, 1932. Serial No. 601,272

3 Claims. (Cl. 170—68)

My invention relates to a wind driven unit, designed primarily for generating electricity for the charging of storage batteries, but it is to be understood that the electrical energy generated thereby may be employed in any connection for which it is found applicable.

The essential objects of my invention are to improve and refine the construction of the device forming the subject of Letters Patent 1,793,321 granted me February 17, 1931; to arrange the generator of the unit upon the top of the tower which supports the unit; to provide for the swinging of the generator of the unit in all directions determined by the action of the wind upon an element of the unit; to provide for the freely turning of the unit; and to attain these ends in a strong, durable, compact, thoroughly efficient, readily assembled and comparatively inexpensive structure.

To the above ends and others which may hereinafter appear, my invention consists of such parts, and such combination of parts which fall within the scope of the invention as claimed.

In the drawings:—

Figure 3 is a sectional view on line 4—4 Figure 5.

Figure 4 is a view of the unit looking into the power generating and governor assembly.

Figure 1:
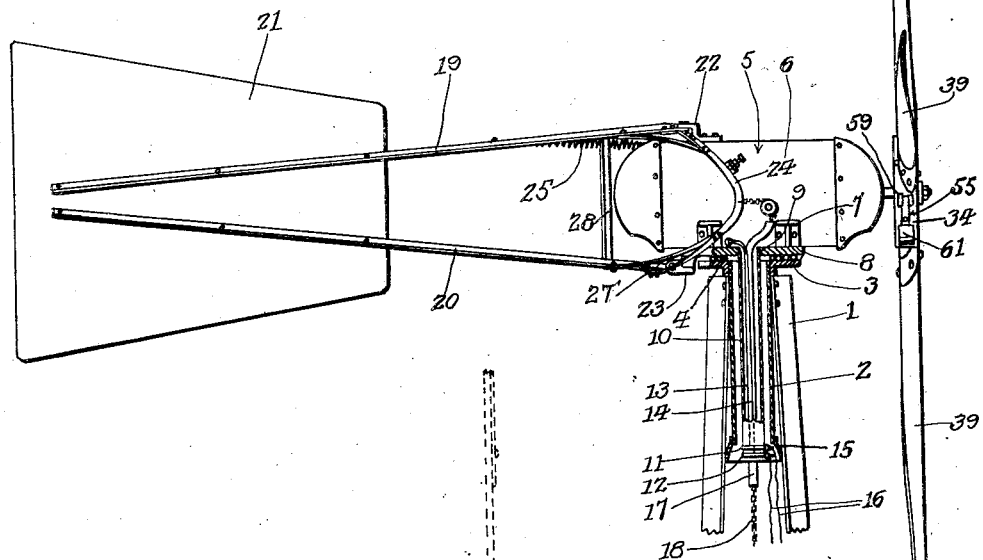
Figure 1 is a side elevation of a wind driven unit, in accordance with my invention.

Referring to the drawings, 1 indicates the upper portion of a tower having arranged therein and secured thereto a vertically disposed sleeve 2 extended above the upper end of tower 1. The upper end of sleeve 2 has secured thereto a laterally flanged collar 3 upon which is seated bearing balls 4. A horizontally disposed generator is indicated at 5, and secured to the housing 6 thereof by brackets 7 is a turntable 8 of disclike form having a central opening 9. The turntable 8 is arranged at the bottom of housing 6 and seats upon the bearings balls 4. The collar 3, balls 4 and turntable 8 provide a thrust bearing for generator 5. Secured to the wall of opening 9 and depending therefrom into sleeve 2 is a tubular member 10 provided at its lower end with a pair of spaced superposed collector rings 11, 12 which are connected by the leads 13, 14 respectively, arranged within and extended from member 10 and connected to generator 5. The lower end of sleeve 2 has attached thereto a cover 15 for the rings 11, 12 and extended from the latter are the charging circuit connections 16. Extending through member 10 is a cover member 17 for a pull chain 18, the purpose of the latter will be hereinafter referred to.

Figure 2:
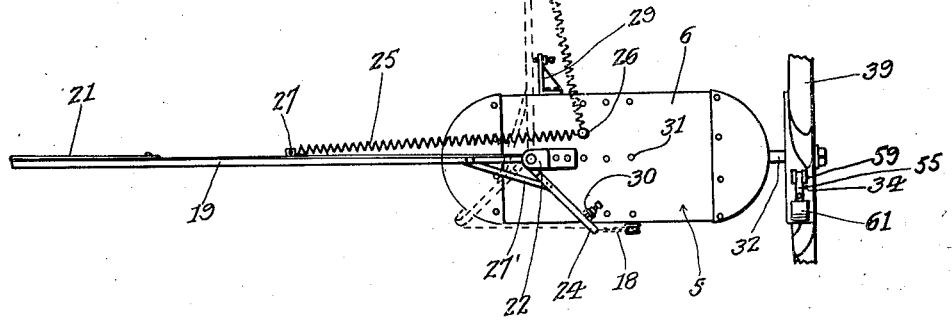
Figure 2 is a fragmentary view in top plan.

Connected with and extended from the generator 5 is a vane assembly comprising a pair of supporting arms 19, 20 extending towards each other from rear to front and secured at their outer portions to one side of the vane 21. The top and bottom of housing 6 have secured thereto brackets 22, 23 respectively arranged diametrically opposite each other. The inner ends of arms 19, 20 are pivoted to brackets 22, 23 respectively. Fixed to the rear ends of the arms 19, 20 is a yoke 24 to which the pull chain 18 is attached and the latter functions to shift the arms 19, 20 from the dotted to the full line position Figure 2. The arms 19, 20 are spring controlled and the controlling spring therefor is indicated at 25, the latter being attached to housing 6, as at 26 and to an arm 19 as at 27. Brace members 27' are provided for the yoke 24 and which are secured to the latter and arms 19, 20. A combined brace and stop bar 28 is secured to the latter in proximity to their inner ends. Adjustable stop members 29, 30 are provided for yoke 24 and bar respectively. The stop members are secured to opposite sides of the housing 6, and the latter is formed with ventilating openings 31. The generator shaft is designated 32, extends from one end of housing 6 and has a tapered grooved outer end portion 33.

The shaft 32 is operated from a wind driven driving mechanism therefor consisting of a housing 34 formed of an annular body part 35, a front closure 36 and a' rear closure 37. The body part 35 is formed with a series of equidistant openings 38 corresponding in number to a set of wind driven blades employed for the purpose of revolving the housing 34 for the purpose of operating shaft 32. As shown, three wind driven blades 39 are employed and which are secured on the outer ends of shafts 40, which extend through the openings 38 and bearing elements 41, the latter being mounted in collars 42 extended from the outer periphery of body part 35.

The inner face of the front closure 36 has formed integral therewith a hub 43 having a reduced end 44 and peripheral recesses 45. Mounted in the latter are bearing elements 46 for the reduced inner ends 47 of the shafts 40. The end 33 of shaft 32 is keyed, as at 48 to hub 43, extends from the front closure 36 and carries a holding nut 49. Secured to each shaft 40 in proximity to its inner end is a quadrant shaped gear 50 which meshes with a revoluble spider gear 51 mounted upon the reduced end 44 of the hub 43. A nut 52 engages with hub 43 for maintaining gear 51 thereon.

The driving mechanism for shaft 32 includes a governor device comprising a set of centrifugally operated weight carrying members corresponding in number to the number of shafts 40 and which are spaced equi-distant from each other. Extended from the gear 51 is a series of radially disposed apertured protuberances 53 and to one of which is suitably attached a dash pot 54 pivotally connected with the inner face of body part 35. The weight carrying members, indicated at 55 are arranged exteriorly and interiorly of body part 35 and each of which includes inner and outer arms 56, 57 respectively. The arm 56 is pivotally connected, as at 58 to a protuberance 53, is disposed at an inclination with respect to the latter, extended through body part 35 and merges into one end of arm 57. Formed integral with the outer periphery of body part 35 are spaced lugs 59, to each of which a weight carrying member 55 is pivotally connected at the point of joinder of the arms of such member. The pivots for members 55 being indicated at 60. The arm 57 is curved and disposed circumferentially of body part 35 and has fixed to its outer end a weight 61 having a curved inner face 62 for seating against body part 35 and an adjustable stop 63 extended through and coupled to the latter. The arm 57 carries a spring controlling means therefor consisting of a threaded, adjustable spring tensioning bar 64 which is extended therethrough and through body part 35 and has an abutment 65 at its inner end. Surrounding bar 64 and interposed between abutment 65 and body part 35 is a coiled spring 66. Mounted on the outer end of bar 64 is an adjusting nut 67. The members 55 are substantially in the form of bell crank levers.

The generator housing will be provided with supports 68, only one shown for shaft 32 and the latter will be formed with a stop collar 69 which will abut a support 68 as shown in Figure 4. This arrangement prevents the shifting of shaft 32 lengthwise of the generator.

The dash pots act to dampen or prevent the too sudden movement of the weights, thereby giving them a smoother action in sharply variable winds. The connection of the weight carrying arms with the spider gear and the gear connection between the blade shafts and the spider gear provide for speed control as the arrangement due to centrifugal action will move the blades into a more nearly edgewise position in relation to the wind for speed control.

The unit, as a whole, constitutes a very simple and reliable means for the generating of electricity, for farm storage battery systems, charging any type of batteries at a charging station and for other electrical purposes, and the embodiment of the invention as illustrated and described eliminates any unnecessary moving parts, which insures a minimum of wear and maximum of use for long operating periods.

What I claim is:—

1. In a wind driven unit for generating electricity, a propelled shaft, a revoluble housing fixed to said shaft for operating it, a set of adjustable radially disposed shafts rotatably mounted in and extended from the housing, each of the shafts of said set being provided at its outer end with a wind driven blade and at its inner end with a quadrant shaped gear, an adjustable spider gear revolubly mounted in said housing and meshing with said quadrant gears for adjusting the shafts of said set, said spider gear being formed with radially disposed lugs, centrifugally operated angle-shaped weight carrying members pivotally connected intermediate their ends to the housing and each having a part seated on the latter exteriorly thereof and a part extending into the housing and pivotally connected to one of said lugs, dash pots pivotally connected to said lugs and to the housing, and radially disposed adjustable stops for and extending through said members into the housing and each including a controlling spring mounted against the inner end thereof and abutting the housing.

2. In a unit for generating electricity, a revoluble housing, a propelled shaft extending into the housing at the axis thereof, means within the housing for anchoring the shaft to the latter to provide for the bodily moving of the shaft and housing together, a set of adjustable radially disposed shafts revolubly mounted intermediate their ends in the body of the housing, each shaft of said set being provided with a wind driven blade at its outer end and a gear at its inner end, an adjustable spider gear revolubly mounted about said means and meshing with the gears on said shafts of said set for adjusting them, said spider gear being formed with spaced radially disposed lugs, centrifugally operated weight carrying members, each formed of an outer and an inner part disposed at an angle to each other, said outer part being arranged exteriorly of said housing and carrying a weight, said inner part extending into the housing and being pivotally connected to a lug, means exteriorly of the housing for pivoting said members thereto, dash pots pivotally connected to said lugs and the body of the housing and radially disposed adjustable stops extending through said outer parts into the housing and each including a controlling spring mounted against the inner end thereof and abutting the body of the housing.

3. In a wind driven unit for generating electricity, a propelled shaft for operating a generator, a revoluble housing fixed to said shaft for driving it, a set of adjustable radially disposed shafts rotatably mounted intermediate their ends in and extended from the body of the housing, each of the shafts of said sets provided at its outer end with a wind driven blade and at its inner end with a quadrant shaped gear, an adjustable spider gear revolubly mounted in said housing and meshing with said quadrant gears for simultaneously adjusting the shafts of said set, centrifugally operated angle-shaped weight carrier members pivotally mounted intermediate their ends upon the outer periphery of the body of the housing and each having a part arranged exteriorly of the latter and a part extending into the housing and pivotally connected to said spider gear, dash pots pivotally connected with the spider gear and body of the housing, a weight integral with that part of each of said members arranged exteriorly of the housing, and radially disposed adjustable spring controlled stops extending through the parts of said members arranged exteriorly of the housing and into the latter, the controlling springs for said stops arranged within and bearing against the body of the housing.

JOSEPH H. JACOBS.